(12) United States Patent
Sato (10) Patent No.: US 8,232,665 B2
(45) Date of Patent: Jul. 31, 2012

(54) VERTICAL WIND COLLECTOR AND REDIRECTING TOWER

(75) Inventor: Shigeru Sato, Saga (JP)

(73) Assignees: Shigeru Sato, Saga (JP); Yoshimasa Hashimoto, Fukuoka (JP)

(*) Notice: Subject to any disclaimer, the term of this patent is extended or adjusted under 35 U.S.C. 154(b) by 453 days.

(21) Appl. No.: 12/519,204

(22) PCT Filed: Dec. 18, 2007

(86) PCT No.: PCT/JP2007/074303
§ 371 (c)(1),
(2), (4) Date: Jun. 15, 2009

(87) PCT Pub. No.: WO2008/075676
PCT Pub. Date: Jun. 26, 2008

(65) Prior Publication Data
US 2010/0084867 A1 Apr. 8, 2010

(30) Foreign Application Priority Data

Dec. 20, 2006 (WO) .................. PCT/JP2006/325393

(51) Int. Cl.
*F03D 9/00* (2006.01)
(52) U.S. Cl. ............................................. 290/55; 290/44
(58) Field of Classification Search ............ 290/44, 290/55
See application file for complete search history.

(56) References Cited

U.S. PATENT DOCUMENTS

| | | | | |
|---|---|---|---|---|
| 1,112,203 A | * | 9/1914 | Fandrey | 415/4.4 |
| 3,832,853 A | * | 9/1974 | Butler, Jr. | 60/641.12 |
| 4,004,427 A | * | 1/1977 | Butler, Jr. | 60/698 |
| 4,079,264 A | * | 3/1978 | Cohen | 290/55 |
| 4,122,675 A | * | 10/1978 | Polyak | 327/28 |
| 4,421,452 A | * | 12/1983 | Rougemont | 415/4.2 |
| 4,452,046 A | * | 6/1984 | Valentin | 60/641.11 |
| 5,518,362 A | * | 5/1996 | Kivilammi | 415/2.1 |
| 5,850,108 A | * | 12/1998 | Bernard | 290/54 |

(Continued)

FOREIGN PATENT DOCUMENTS

GB 2081390 A 2/1982

OTHER PUBLICATIONS

International Search Report for PCT Patent App. No. PCT/JP2007/074303 (Feb. 26, 2008).

(Continued)

*Primary Examiner* — Tulsidas C Patel
*Assistant Examiner* — Stefan Mikailoff
(74) *Attorney, Agent, or Firm* — Cermak Nakajima LLP; Tomoko Nakajima (57) ABSTRACT

The wind power generator includes: a wind tunnel formed by a columnar member erected on a foundation in a vertical direction; a plurality of wind-collecting plates that extends from a circumferential wall of the columnar member in directions normal to the circumferential wall; a plurality of upper and lower guide plates provided between the wind-collecting plates; a plurality of wind inlets that introduces wind collected by the wind-collecting plates into the wind tunnel; back-flow preventing means that allow only the flow of wind blowing from the outside of the columnar member into the inside of the columnar member; a turbine that is driven by wind blowing out from one end of the wind tunnel, and power generator that is driven by the turbine.

6 Claims, 7 Drawing Sheets

U.S. PATENT DOCUMENTS

| | | | | |
|---|---|---|---|---|
| 5,982,046 A | | 11/1999 | Minh | |
| 6,510,687 B1 | * | 1/2003 | Zaslavsky et al. | 60/398 |
| 6,765,309 B2 | * | 7/2004 | Tallal et al. | 290/55 |
| D516,581 S | * | 3/2006 | Gomez Gomar | D15/1 |
| 7,400,057 B2 | * | 7/2008 | Sureshan | 290/55 |
| 7,757,490 B2 | * | 7/2010 | Kenessey | 60/641.12 |
| 7,866,938 B2 | * | 1/2011 | Kariya | 415/4.4 |
| 7,875,992 B2 | * | 1/2011 | Gray | 290/55 |
| 8,134,252 B2 | * | 3/2012 | Pagliasotti | 290/55 |
| 2010/0181779 A1 | * | 7/2010 | Elliott et al. | 290/55 |

OTHER PUBLICATIONS

Office Action for Australian Patent App. No. 2007335505 (Nov. 23, 2010).

Office Action for Canadian Patent App. No. 2,673,230 (May 25, 2011).

Office Action for New Zealand Patent App. No. 577700 (Aug. 10, 2011).

* cited by examiner

FIG.7

VERTICAL WIND COLLECTOR AND REDIRECTING TOWER

CROSS-REFERENCE TO RELATED APPLICATIONS

This application is a national phase entry under 35 U.S.C. §371 of PCT Patent Application No. PCT/JP2007/074303, filed on Dec. 18, 2007, which claims priority under 35 U.S.C. §119 to PCT Patent Application No. PCT/JP2006/325393, filed Dec. 20, 2006, which is incorporated by reference.

FIELD OF THE INVENTION

The present invention relates to a wind power generator, and more particularly, to a wind power generator comprising a wind collector and redirecting tower that generates electric power by efficiently utilizing energy of natural wind.

BACKGROUND OF THE INVENTION

Conventionally, various types of wind power generators have been proposed and embodied. Among these wind power generators, there has been a wind power generator that includes wind inlets arranged on the side surface of a wind tunnel at four positions at an interval of 90° to rotate a fan by wind introduced into the wind tunnel (see, e.g. Patent Literature 1).

Patent Literature 1: JP 2004-190506 A

However, the above-mentioned fan rotating type wind power generator has problems in that it is not possible to efficiently introduce wind around the wind tunnel into the wind tunnel and that the wind introduced into the wind tunnel blows through from the inside of the wind tunnel to the leeward side. Therefore, the energy of wind has not been effectively used. Further, conventionally, it has been attempted to collect wind by facing a trumpet-shaped opening toward the windward side. However, since the direction of the opening should be adjusted according to the wind direction, a complicated adjustment mechanism is required, and thus it is difficult to increase in size.

An object of the invention is to provide a wind power generator comprising a wind collector and redirecting tower that is capable of efficiently generating electric power by effectively utilizing the energy of wind even if the wind is weak and regardless of a wind direction. Advantageously, the simple structure of the wind collector and redirecting tower makes it easy to increase the size of the tower and the power therefrom.

SUMMARY OF THE INVENTION

A wind power generator according to an aspect of the invention includes: a wind tunnel formed by a columnar member erected on the surface of a foundation in a vertical direction; a plurality of wind-collecting plates that extends from a circumferential wall of the columnar member in directions normal to the circumferential wall; a top plate that closes an upper end opening of the columnar member and upper end openings of spaces between adjacent wind-collecting plates; a plurality of wind inlets that is formed on the circumferential wall of the columnar member to introduce wind collected by the wind-collecting plates into the wind tunnel; back-flow preventing means arranged at the wind inlets for allowing only the flow of wind blowing from outside of the columnar member into inside of the columnar member, while regulating the flow of wind blowing from the inside to the outside; a plurality of guide plates arranged between adjacent wind-collecting plates for guiding the wind collected by the wind-collecting plates downward; a turbine that is driven by wind blowing out from one end of the wind tunnel; and a power generator driven by the turbine.

Further, it is preferable that the wind power generator according to the aspect of the invention further includes second back-flow preventing means arranged between outer portions of adjacent wind-collecting plates for allowing the flow of wind blowing into spaces between the wind-collecting plates from outside, while regulating the flow of wind blowing from the spaces between the wind-collecting plates to the outside. Furthermore, it is preferable that six wind-collecting plates are provided on the columnar member at regular intervals in a circumferential direction. It is preferable that the wind power generator further includes surplus wind discharging units arranged in the wind tunnel for discharging surplus wind introduced into the wind tunnel. It is preferable that other than the turbine and the power generator, more than one turbine and power generator are provided in a flow direction of wind in one wind tunnel, and a rotary impeller of each of the turbines is configured in such manner that one-half to one-quarter of the rotary impeller protrudes into the wind tunnel.

According to the wind power generator of an embodiment of the invention, wind is collected toward the wind tunnel by the plurality of wind-collecting plates, particularly, six wind-collecting plates and a plurality of guide plates. Accordingly, wind blowing in any direction can be introduced into the wind tunnel by the plurality of wind-collecting plates and guide plates positioned on the windward side while the wind is compressed. Further, since the back-flow preventing means are provided at the wind inlets, the wind introduced into the wind tunnel does not blow through to the leeward side. In addition, since the second back-flow preventing means are provided between adjacent wind-collecting plates, it is possible to efficiently introduce the wind, which has been introduced into spaces between the wind-collecting plates, into the wind tunnel. Further, since the surplus wind in the wind tunnel is discharged from the surplus wind discharging units, a large load is not applied to the turbine even during strong wind. Furthermore, since the plurality of turbines and power generators is provided in one wind tunnel in a flow direction of wind and the turbines are arranged in such a manner that about one-half to one-quarter of a rotary impeller of each of the turbines protrudes into the wind tunnel, power generation efficiency is improved. Basically, the wind power generator can be formed by erecting the columnar member and the plurality of wind-collecting plates on the surface of a foundation, which is provided on the ground where turbines and power generators are provided, in a vertical direction. Accordingly, it is possible to appropriately set the height of the columnar member, the diameter of the wind tunnel, and the width of the wind-collecting plate according to conditions, such as the average wind speed at an installation place and the amount of necessary power to be generated and thus, a wind power generator and a wind power equipment suitable for various conditions at an installation place can be installed.

BRIEF DESCRIPTION OF THE DRAWINGS

The present invention will be better understood in view of the appended non-limiting figures, in which.

DETAILED DESCRIPTION OF THE INVENTION

A wind power generator according to an embodiment of the invention will be described with reference to drawings. As shown in FIGS. 1-4, the wind power generator 10 includes a power generator chamber 11 arranged under the ground, and a wind-collecting means 12 (e.g., a wind collector and redirecting tower) arranged on the ground. The power generator chamber 11 includes an underground wind tunnel 30 that communicates with a wind tunnel (not shown) in the wind-collecting means 12. In the underground wind tunnel 30, turbines 31, which are rotationally driven by the wind flowing through the underground wind tunnel 30, respectively drive power generators 32. In embodiments, an observatory 41 may be provided at a top of the wind power generator 10, and a hall 42 may be provided at the bottom of the wind power generator 10.

Figure 2:
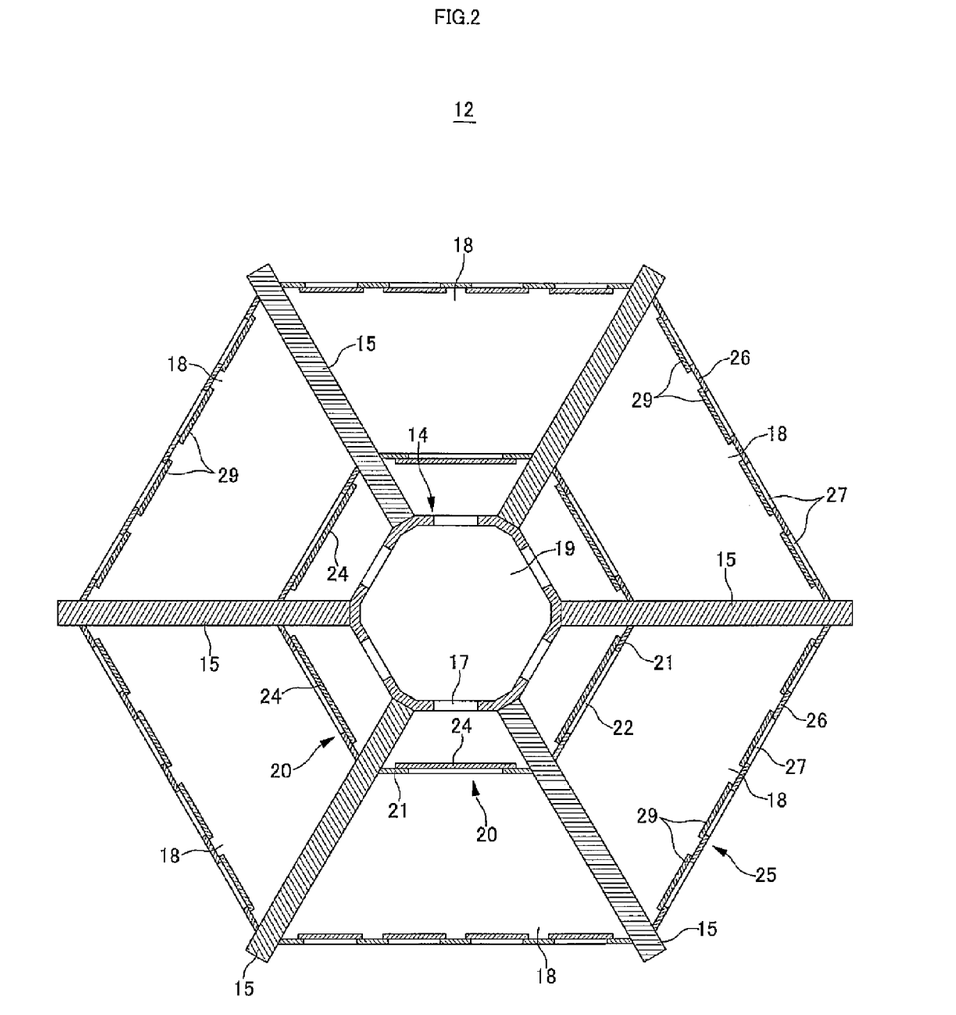
FIG. 2 is a cross-sectional view of the wind power generator.

The wind-collecting means 12 includes a columnar member 14 that is erected on a foundation 13, as shown in FIG. 2. The wind-collecting means 12 further includes six wind-collecting plates 15. Each plate comprises a lower end that is fixed to the foundation 13, and a base that is fixed to a circumferential wall of the columnar member 14. For example, the base of each plate 15 extends from a surface of the circumferential wall in a direction normal to the circumferential wall. The wind-collecting means 12 further includes a top plate 16 that closes an upper end opening of the columnar member 14 and upper end openings between adjacent wind-collecting plates 15. The wind-collecting means 12 also includes a plurality of second back-flow preventing means 25 comprising a plurality of openings 27 that allow wind to enter the wind-collecting means 12 on the windward side of the redirecting tower.

Figure 1:
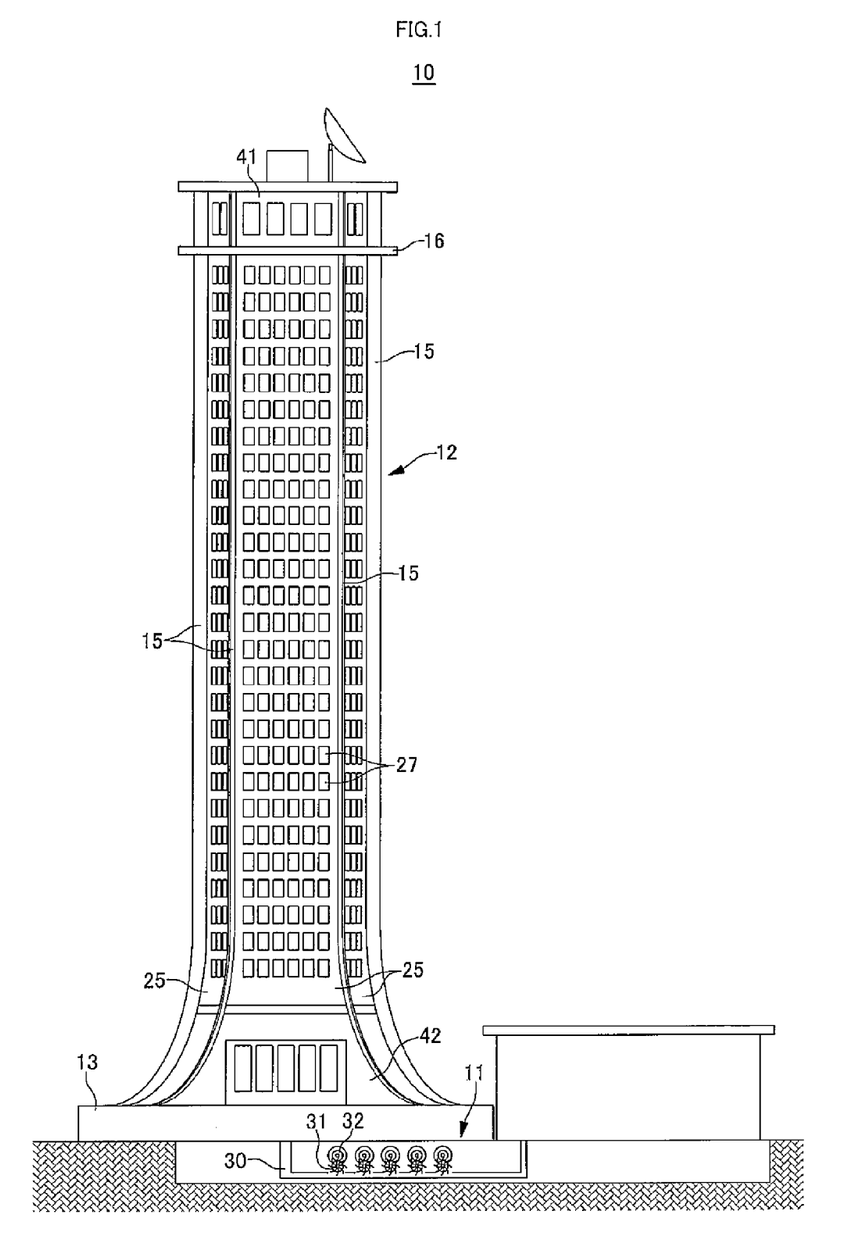
FIG. 1 is a front view of a wind power generator according to an embodiment of the invention.

As shown in FIG. 2, the columnar member 14 includes a wind tunnel 19, which connects with the power generator chamber 11 (as described in FIG. 1). The columnar member 14 is for example formed in the shape of a hexagon, with the base of the wind-collecting plates 15 being fixed to each angular portion of the columnar member 14, and a wind inlet 17 being formed on each side portion of the columnar member 14. In embodiments, the wind inlet 17 may be formed by punching out a wall plate of the columnar member 14 in a quadrangular shape.

The columnar member 14 may be separately formed of a plurality of pieces in a circumferential direction and height direction according to the height and diameter thereof, and may be assembled at a place where the wind power generator is installed. Further, the columnar member 14 may be formed to have the same diameter in the height direction as a whole, or may be formed in a gentle conical shape in which the lower portion has a larger diameter and the upper portion has a smaller diameter, according to the strength of the columnar member 14 or the pressure state in the wind tunnel 19 and the like.

If the direction of the wind is substantially constant throughout the year, two or three wind-collecting plates 15 may be used. However, it is most preferable that six wind-collecting plates be used to efficiently collect wind in all directions. That is, if six wind-collecting plates 15 are arranged around the columnar member 14 at regular intervals, it is possible to collect wind to the center and to introduce the wind into the wind tunnel 19 by at least two adjacent wind-collecting plates 15 regardless of the direction from which the wind blows. Meanwhile, seven or more wind-collecting plates 15 may be provided. However, the wind-collecting effect is not improved enough correspondingly to the increase of the cost of the generator, and thus is not economical. According to the height and width, the wind-collecting plates 15 may also be separately formed of a plurality of pieces in a height direction and width direction and may be assembled.

Figure 3:
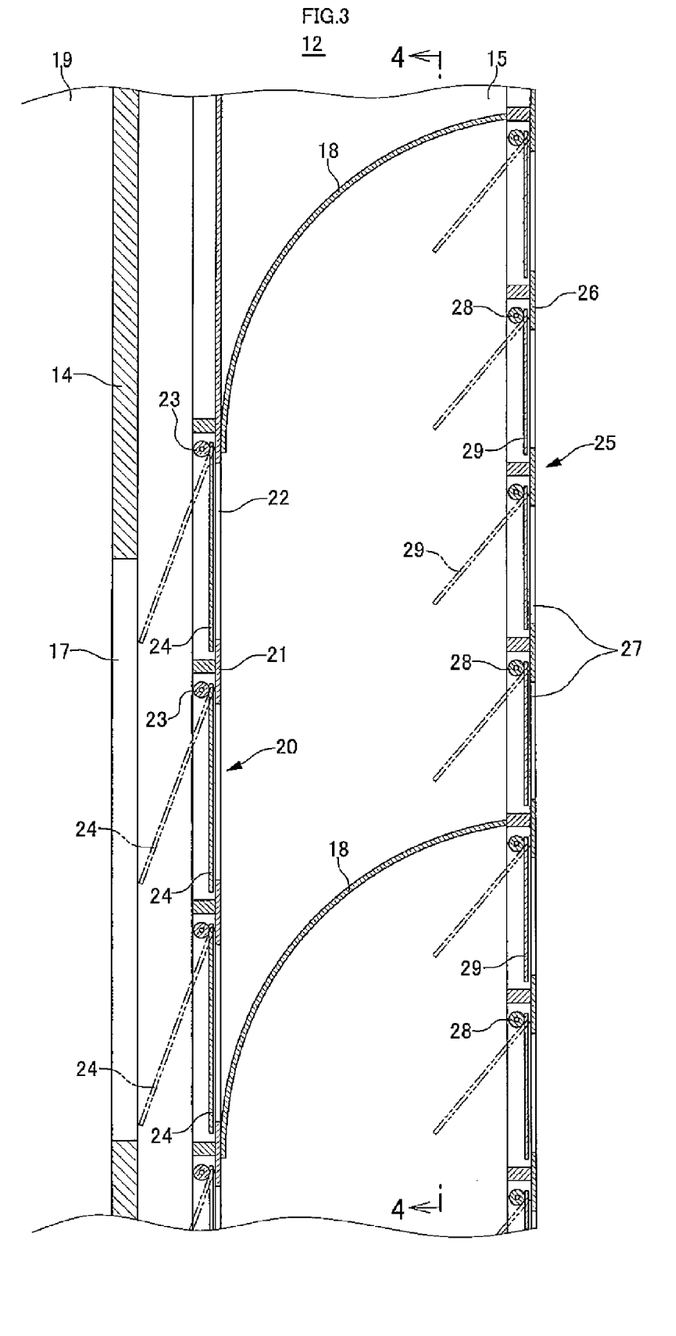
FIG. 3 is a longitudinal sectional view of the central portion of the generator.
Figure 4:
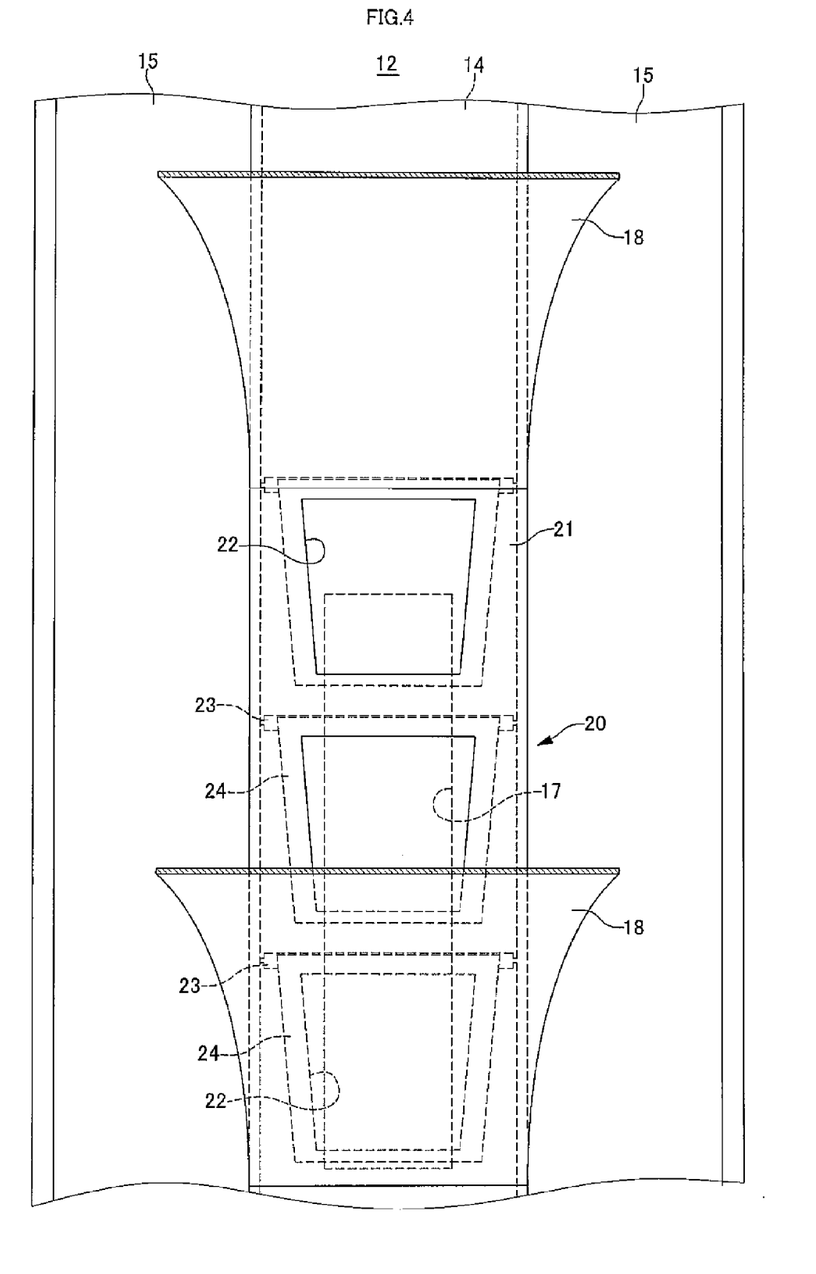
FIG. 4 is a sectional view taken along a line 4-4 of FIG. 3.

As shown in FIGS. 2, 3 and 4, the wind-collecting means 12 may further include a guide plate 18 for directing the wind into the columnar member 14. The side view of the guide plate 18 is curved in an arc shape, in which an end side of the guide plate 18 (e.g., the side closest to the openings 27) is substantially parallel to the horizontal direction and a base side of the guide plate 18 (e.g., the side closest to the columnar member 14) is substantially parallel to the vertical direction. A gap between upper and lower guide plates 18 may be set according to a distance between the base and an outer end of the wind-collecting plate 15. Further, the guide plates 18 are configured to connect adjacent wind-collecting plates 15 to each other, thereby reinforcing the wind-collecting plates 15.

The wind collected by the wind-collecting plates 15 and the guide plates 18 arranged as described above, is converged into an apex of a triangle in plan view, the lowermost portion of which is surrounded by the foundation 13 (shown in FIG. 1), the uppermost portion of which is surrounded by the top plate 16 (shown in FIG. 1), and which is further surrounded by the upper and lower guide plates 18. Accordingly, the guide plates 18 function such that as the wind blows into the wind tunnel 19 from the wind inlets 17 the pressure of the wind is increased and the flow direction of the wind is changed into a downward direction.

As also shown in FIGS. 2, 3, and 4, the wind-collecting means 12 further includes a plurality of wall plates 21. The wall plates 21 may be provided with a first back-flow preventing means 20, which allows the flow of wind blowing into the inside of the columnar member 14 while regulating the flow of the wind blowing from the inside of the columnar member 14 to the outside of the wind-collecting means 12. The wall plates 21 are arranged between the bases of adjacent wind-collecting plates 15 on the outside of the wind inlets 17.

The first back-flow preventing means 20 are formed by attaching a swing flap 24 with a hinge 23 at an upper portion of an inside of an opening 22 formed in the wall plates 21. When wind pressure is applied to the flap 24 from the outside, a lower portion of the flap 24 is opened about the hinge 23 toward the wind inlet 17 so as to allow the flow of the wind into the inside of the columnar member 14 from the outside. Further, when wind pressure is not applied to the flap 24 from the outside, the flap 24 closes the opening 22 due to its own weight, thereby regulating the flow of the wind that blows from the inside of the columnar member 14 to the outside of the wind-collecting means 12.

Figure 5:
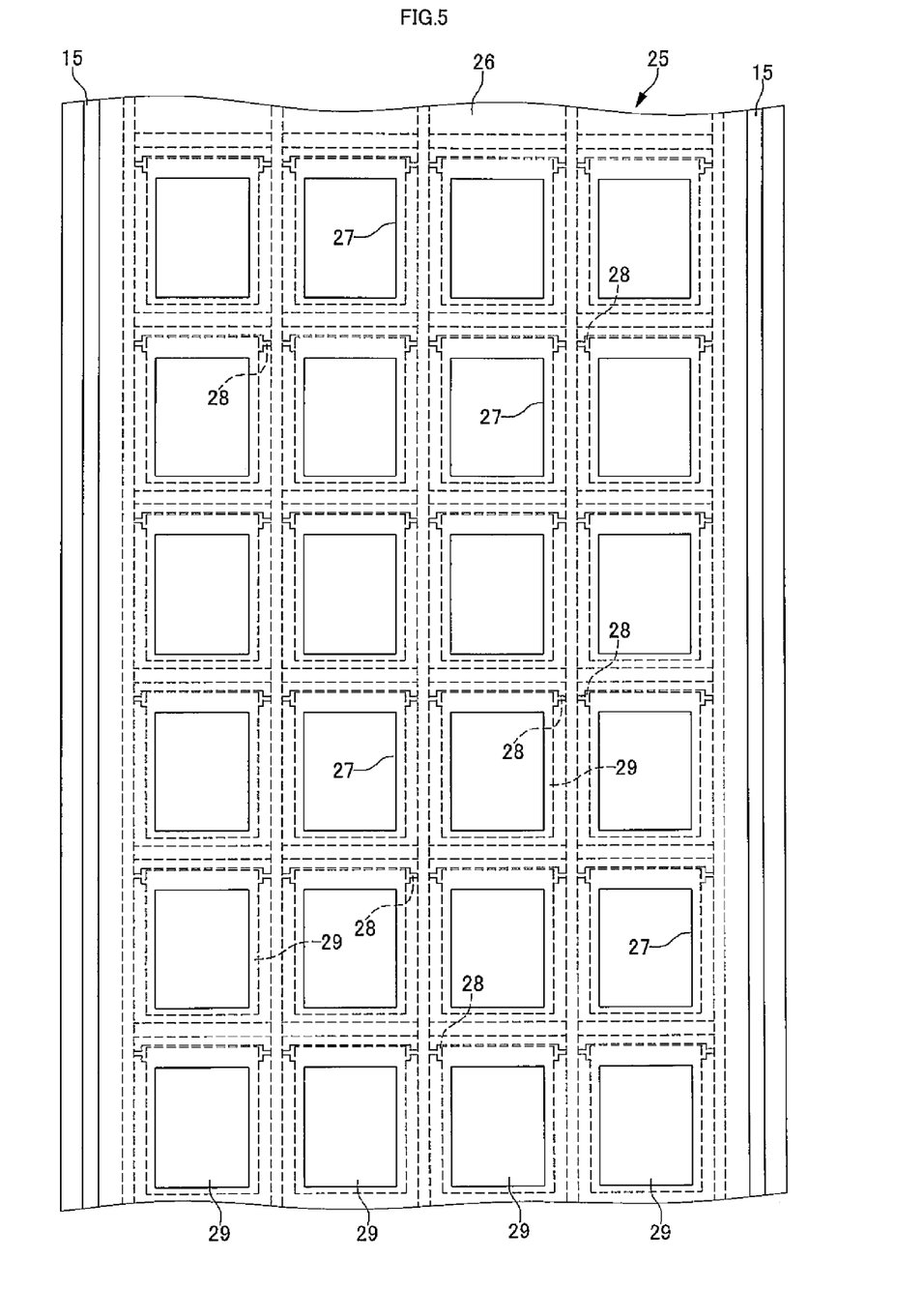
FIG. 5 is a front view of the central portion of the generator.

In addition, as shown in FIGS. 2, 3 and 5, the second back-flow preventing means 25, which allow the flow of the wind blowing from the outside into spaces between the wind-collecting plates 15, while regulating the flow of the wind blowing from the spaces between the wind-collecting plates 15 to the outside, is arranged at the outer ends of adjacent wind-collecting plates 15. Like the back-flow preventing means 20 that is arranged at the base side of the wind-collecting plates 15, the second back-flow preventing means 25 is formed by attaching a swing flap 29 on the inside of an opening 27 with a hinge 28 at an upper portion of the opening 27 formed in a wall plate 26 covering the spaces between the outer ends of the wind-collecting plate 15. When wind pressure is applied to the flap 29 from the outside, a lower portion of the flap 29 is also opened about the hinge 28 toward the inside to allow the flow of the wind that blows into the space between the wind-collecting plates 15 from the outside. Further, when wind pressure is not applied to the flap 29 from the outside, the flap 29 closes the opening 27 due to its own weight, thereby regulating the flow of the wind that blows from the inside to the outside of the wind-collecting means 12.

Accordingly, the flaps 24 and 29 of the back-flow preventing means 20 and 25, which are positioned on the windward side, are automatically opened by the wind pressure, and the flaps of the back-flow preventing means 20 and 25, which are positioned on sides other than the windward side (e.g., the leeward side), are automatically closed. By further providing rubber sealants between the peripheral portions of the openings 22 and 27 and the flaps 24 and 29 respectively, adhesion can be improved, and thus, a secured closed state can be achieved. Meanwhile, the structure of the back-flow preventing means 20 and 25 is not limited thereto.

The back-flow preventing means 20 and 25 formed, as described above, opens the lower portions of the openings 22 and 27 to make the wind flow: (i) from the outside of the wind power generator 10 through the openings 27 into the spaces between the wind-collecting plates 15; (ii) from the spaces between the wind-collecting plates 15 through the openings 22 into the wind tunnel 19; and (iii) downward through the wind tunnel 19 to the power generator chamber 11. In particular, it is possible to efficiently make the wind flow down the tower toward the power generator chamber 11 (as shown in FIG. 1) provided at the lower end of the wind tunnel 19 due to a synergistic effect of the guide plates 18 and the back-flow preventing means 20. Further, it is possible to prevent the wind, which is introduced into the spaces between the wind-collecting plates 15 and the wind tunnel 19, from blowing to the outside by the back-flow preventing means 20 and 25. Accordingly, it is possible to effectively use the introduced wind to generate electric power.

The size and the number of the wind inlets 17 and of the back-flow preventing means 20 and 25 (which, collectively, determine the incoming flow rate) are set according to the desired amount of the wind to be collected by the wind-collecting plates 15. For example, if the width of the wind-collecting plate 15 is small, the number of the wind inlets may be set to be small or the size of the wind inlet 17 may be set to be small. Conversely, if the width of the wind-collecting plate 15 is large, the number of the wind inlets may be set to be large and the size of the wind inlet 17 or the back-flow preventing means 20 and 25 may be set to be large.

Figure 6:
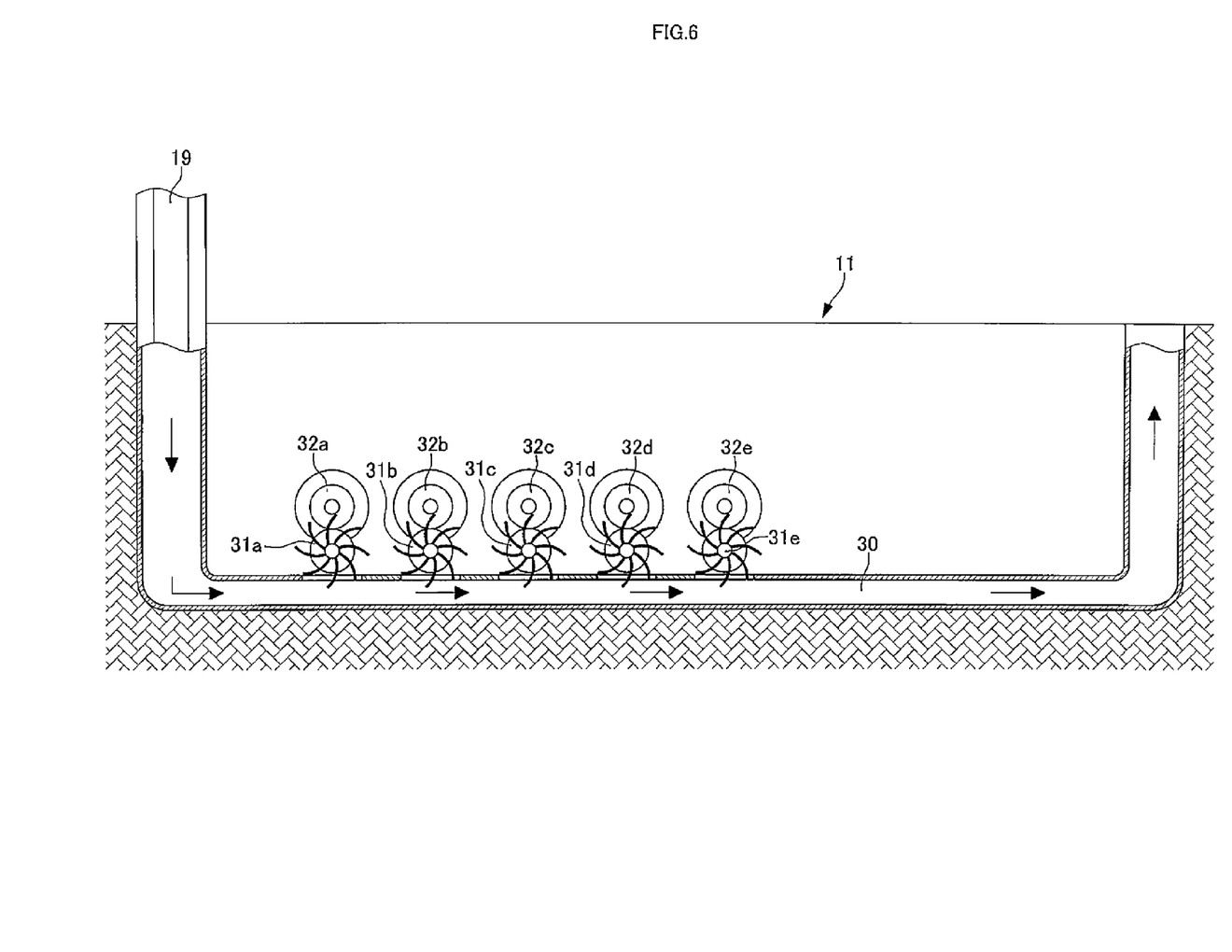
FIG. 6 is a longitudinal sectional view of an example where a plurality of turbines and power generators are arranged in one wind tunnel.

As shown in FIG. 6, the power generator chamber 11, which is provided under the ground, is provided with an underground wind tunnel 30 that communicates with the wind tunnel 19. In the underground wind tunnel 30, turbines 31a-31e, which are rotationally driven by the wind flowing through the underground wind tunnel 30, respectively drive the power generators 32a-32e. Additionally, the power generator chamber 11 may also be provided with other power transmission equipments for driving the power generators 32a-32e. The turbines 31a-31e and the power generators 32a-32e may be selected to correspond to the pressure and amount of wind that is supplied to the underground wind tunnel 30 from the wind tunnel 19, and may be selected in accordance with the intended use of electric power at a place where the wind power generator 10 is installed. Further, the wind, which has driven the turbines 31a-31e, is discharged to the atmosphere from the end of the underground wind tunnel 30.

Furthermore, the wind power generator 10 may also include surplus wind discharging units, which release pressure to the outside of the wind power generator 10 from the inside of the wind tunnel 19 when the pressure in the wind tunnel 19 exceeds a predetermined pressure. For example, the surplus wind discharging units may be provided at the upper and lower ends of the wind tunnel 19, respectively, such that it is possible to discharge the surplus wind that is introduced into the wind tunnel 19 during strong wind, thereby preventing an overload of the turbines 31a-31e. In embodiments, the surplus wind discharging units may be vents formed on the top plate 16 and the vents may include flap-shaped members for opening and closing the vents.

The operating pressure of the surplus wind discharging units provided at the upper and lower ends of the wind tunnel 19 may be set to a same pressure. However, considering the flow of the wind in the wind tunnel 19, it is preferable that the operating pressure of the lower surplus wind discharging unit is set to be lower than that of the upper surplus discharging unit. Further, the discharge flow rates of the surplus wind discharging units may also be set to a same flow rate. However, considering strong wind e.g., wind from a typhoon, the discharge flow rate of the upper surplus wind discharging unit, which has an operating pressure that is set to be higher than that of the lower surplus discharging unit, is set to a larger flow rate so that the lower surplus wind discharging unit can be operated in a normal variation range of wind power. Accordingly, a small amount of surplus wind is discharged without disturbing the flow of the wind in the wind tunnel 19. During the strong wind such as a typhoon, the upper surplus wind discharging unit, the operating pressure of which is set to be higher, can be also operated, whereby a large amount of surplus wind is discharged. As a result, it is possible to reliably protect devices such as turbines 31.

A plurality of surplus wind discharging units may be provided toward a plurality of directions to set the discharge direction toward the leeward side. In addition, a self-adjusting surplus wind discharging unit, which automatically adjusts a discharge flow rate according to the electric power generating state of the power generator 32, may be provided. Further, it is preferable to provide a drain, which discharges moisture entering the wind tunnel 19, at the bottom of the underground wind tunnel 30 and the wind tunnel 19.

Furthermore, in order to prevent foreign materials from entering the wind tunnel 19 through the wind inlet 17, it is preferable to provide screens on the outside of the wind inlets 17 or the outside of back-flow preventing means 20 and 25. The screens may be provided by constructing general wire meshes or the like on frames and fixing the frames to adjacent wind-collecting plates 15 or the wall plates 21 and 26, for example.

As described above, the columnar member 14, a plurality of (particularly six) wind-collecting plates 15, and the plurality of guide plates 18 are combined with one another as the wind-collecting means 12 of the wind power generator 10. Advantageously, using the wind-collecting means 12 discussed herein it is possible to effectively collect wind blowing in various directions and to utilize the wind for the purpose of electric power generation. Even more advantageously, using the wind wind-collecting means 12 discussed herein it is possible to obtain sufficient output of electric power generation even during weak wind conditions. In addition, it may be possible to reliably supply necessary electric power by selecting the height and diameter according to the conditions at the installation place. Furthermore, with respect to a relatively small-sized wind power generator, a baseplate alternative to the foundation 13 may be integrated with the wind-collecting means 12 to form a unit. The units may then be stacked and used for wind collection and redirection.

As also shown in FIG. 6, a plurality of turbines 31a-31e and power generators 32a-32e may be provided in one underground wind tunnel 30 arranged at predetermined intervals in the flow direction of wind, and the number of operating power generators 32a-32e may be increased or decreased according to wind speed. For example, as shown in FIG. 6, five turbines 31a, 31b, 31c, 31d, and 31e may be provided in the underground wind tunnel 30, and power generators 32a, 32b, 32c, 32d, and 32e, which are driven by the turbines 31a-31e, respectively, may be provided. The wind introduced into the underground wind tunnel 30 rotationally drives the turbines 31a-31e. The power generators 32a-32e are driven by the turbines 31a-31e, respectively, to generate electric power. The wind, which has rotationally driven the turbines 31a-31e, is discharged from the end of the underground wind tunnel 30.

Figure 7:
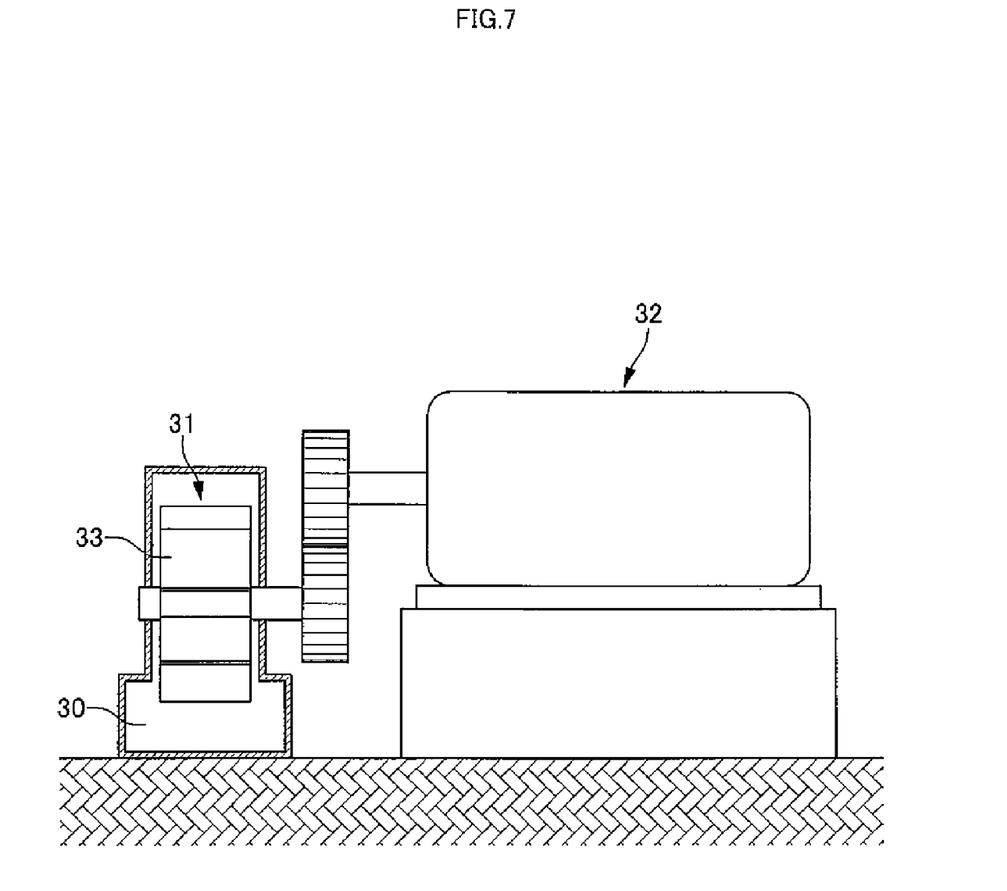
FIG. 7 is a cross-sectional view of a portion where a turbine and a power generator of FIG. 6 are installed.

As shown in FIG. 7, when the plurality of turbines 31 and the power generators 32 are provided as described above, the turbines 31 are arranged in such a manner that about one-half to one-quarter of an impeller 33 of each of the turbines 31 protrudes into the underground wind tunnel 30. Accordingly, the wind in the underground wind tunnel 30 can pass through with a minimalized decrease in wind speed, and thus can rotationally drive the plurality of turbines 31.

The columnar member 14, the wind-collecting plates 15, the guide plates 18, and the like, may be manufactured using appropriate materials and appropriate manufacturing processes for the conditions relevant to the wind power generator 10. For example, the size of the entire wind power generator and/or predicted maximum wind speed may be taken into consideration when selecting materials and processes for constructing the wind power generator 10. In general, a metal material, which is excellent in corrosion resistance, such as stainless steel or an aluminum alloy is preferable, and a structure, in which corrosion-resistant steel sheets or plates made of fiber-reinforced plastic (FRP) or the like are attached to the metal framework, may be adopted.

The width of the wind-collecting plate 15 may be determined according to various conditions at the place where the wind power generator is installed. Further, a ratio between the height and diameter (a diameter of a circle passing through the ends of the wind-collecting plates 15) of the wind power generator 10 may also be arbitrarily selected. For example, if height is not regulated, the height may be increased up to 100 m, 200 m or more, and the width of the wind-collecting plate 15 may be set to be small. If an installation area is sufficient, the height may be suppressed to be small and the diameter of the wind-collecting plate 15 may be increased up to 100 m or more. In general, it is preferable that the wind-collecting plate be formed as high as possible to effectively collect wind in the upper air where the wind is more stable compared to the surface of the earth. For example, the wind-collecting plate 15 may be installed at a rooftop of a skyscraper or the like in order to have sufficient wind collecting efficiency even when the wind-collecting plate 15 is constructed with a height or diameter between several meters and about 10 m.

Advantageously, since the wind-collecting plates 15 are provided in six directions around the columnar member 14, the wind power generator 10 as a building may have sufficient strength against strong wind or an earthquake if the height of the columnar member 14 and the width of the wind-collecting plate 15 are appropriately set. Further, reinforcing members may be provided at appropriate positions if necessary, and an appropriate flexible structure may be employed for quake resistance.

In addition, as discussed with respect to FIG. 1, the observatory 41 may be provided on the top plate 16, and the hall 42 may be provided at the bottom of the wind power generator 10. Further, elevators moving up and down between the hall 42 and the observatory 41 may be provided along the columnar member 14 or the wind-collecting plates 15. In addition to the observatory 41, a heliport, a signal tower, a radio relay station, a meteorological station, an astrophysical observatory, and the like may be provided on the top of the wind power generator 10. Further, for maintenance and inspection of the back-flow preventing means 20 and 25 and the like, ladders (steps) may be formed at the columnar member 14 or the wind-collecting plates 15. In addition, the outer surfaces of the wind-collecting plates 15 and the back-flow preventing means 25 may be used for advertisements. In addition, the wind-collecting plates 15 and the back-flow preventing means 25 may be colored or patterned according to a surrounding scene, or may be illuminated at night.

The invention claimed is:

1. A wind power generator comprising:
   a columnar member forming a wind tunnel in a vertical direction, the columnar member erected on a surface of a foundation;
   a plurality of adjacent wind-collecting plates that extend from a circumferential wall of the columnar member in directions normal to the circumferential wall;
   a top plate that closes an upper end opening of the columnar member and closes upper end openings of spaces between adjacent wind-collecting plates;
   a plurality of wind inlets that are formed on the circumferential wall of the columnar member to introduce wind collected by the wind-collecting plates into the wind tunnel;
   a first back-flow preventing means arranged at the wind inlets for allowing the wind to flow inside of the columnar member from outside of the columnar member, while regulating the flow of air from the inside to the outside of the columnar member;
   a plurality of guide plates arranged between the adjacent wind-collecting plates for guiding the wind collected by the wind-collecting plates downward through the wind tunnel;
   a turbine that is driven by the wind flowing out from one end of the wind tunnel;
   a power generator driven by the turbine; and
   a second back-flow preventing means arranged between outer portions of the adjacent wind-collecting plates for allowing the flow of wind from the outside to the inside of the wind power generator, while regulating the flow of air from the inside to the outside of the wind power generator.

2. The wind power generator according to claim 1, wherein six of the wind-collecting plates are provided on the columnar member at equal intervals in a circumferential direction.

3. The wind power generator according to claim 1, wherein other than the turbine and the power generator, more than one turbine and power generator are provided and arranged in a flow direction of wind in an underground wind tunnel, and
   a rotary impeller of each of the turbines is configured in such manner that one-half to one-quarter of the rotary impeller protrudes into the underground wind tunnel.

4. The wind power generator according to claim 1, wherein the plurality of wind-collecting plates extends outwardly from the circumferential wall.

5. The wind power generator according to claim 1, wherein the plurality of guide plates are provided to surround the circumferential wall of the columnar member.

6. The wind power generator according to claim 1, wherein the plurality of wind-collecting plates are provided through the wind tunnel along an entire length in the vertical direction.

* * * * *